No. 645,028. Patented Mar. 6, 1900.
W. J. BARBER.
INSECT OR WORM DESTROYER.
(Application filed Nov. 17, 1899.)

(No Model.)

Witnesses
John Maupin
_____ Shepard

By their Attorneys, C. A. Snow & Co.

Inventor
W. J. Barber

THE NORRIS PETERS CO., PHOTO-LITHO., WASHINGTON, D. C.

UNITED STATES PATENT OFFICE.

WILLIAM JAY BARBER, OF HONEOYE FALLS, NEW YORK.

INSECT OR WORM DESTROYER.

SPECIFICATION forming part of Letters Patent No. 645,028, dated March 6, 1900.

Application filed November 17, 1899. Serial No. 737,335. (No model.)

*To all whom it may concern:*

Be it known that I, WILLIAM JAY BARBER, a citizen of the United States, residing at Honeoye Falls, in the county of Monroe and State of New York, have invented a new and useful Insect or Worm Destroyer, of which the following is a specification.

This invention relates to insect and worm destroyers, and has for its object to provide certain new and useful improvements for spraying or distributing sand, paris-green, or other preferred poisonous powder upon trees and plants for the purpose of destroying insects, worms, and the like.

It is also designed to provide a hand-operating device which may be conveniently carried by the operator and readily manipulated to apply the powder in the most efficient manner.

Another object is to provide improved means for distributing the powder through the agency of a strong air-blast for the purpose of destroying the nests of the insects or worms in addition to distributing the powder, and in this connection contemplates hand-operating means for conveniently producing an exceedingly-strong air-blast; and, finally, it is designed to automatically expose the powder to the action of the air-blast, so that a predetermined amount of powder may be distributed and also to prevent loss of the powder during the interval between respective operations of the device.

To these ends the present invention consists in the combination and arrangement of parts, as will be hereinafter more fully described, shown in the accompanying drawings, and particularly pointed out in the appended claims, it being understood that changes in the form, proportion, size, and minor details may be made within the scope of the appended claims without departing from the spirit or sacrificing any of the advantages of the invention.

Figure 1:
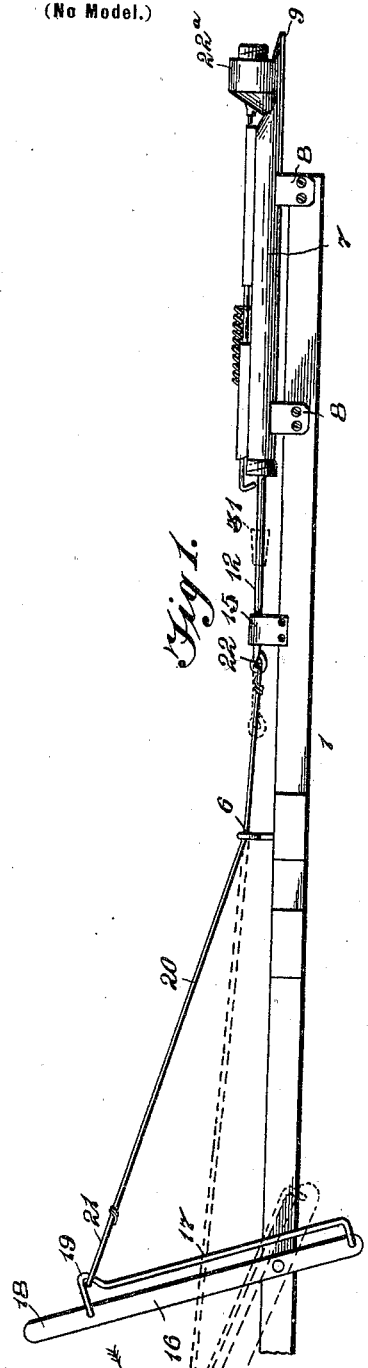
Figure 2:
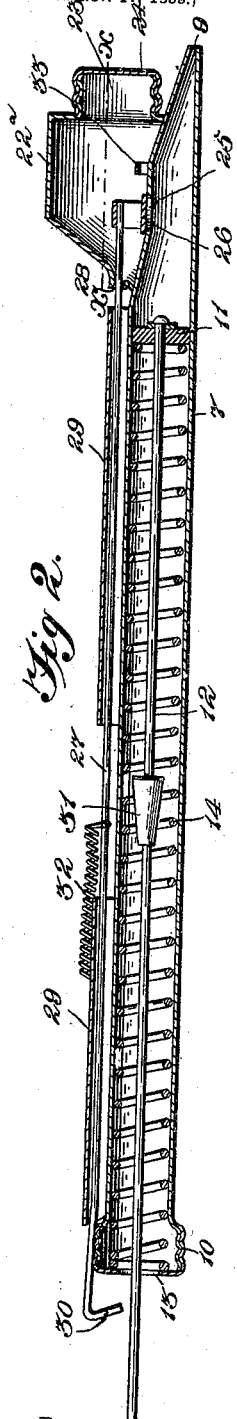
Figure 4:
Figure 5:
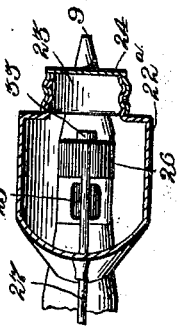

In the drawings, Figure 1 is a side elevation of an insect-destroyer constructed in accordance with the present invention. Fig. 2 is an enlarged detail longitudinal sectional view taken through the means for producing the air-blast and also illustrating the means for exposing the powder to such air-blast. Fig. 3 is a detail sectional view taken on the line X X of Fig. 2. Fig. 4 is a detail sectional view of the handle, illustrating the detachable connection thereof.

Corresponding parts in the several figures of the drawings are designated by like characters of reference.

Referring to the accompanying drawings, 1 designates the handle of the device, preferably in the form of a straight bar formed in two or more sections, so that the latter may be separated for the purpose of storage and transportation. The preferred manner of detachably connecting the sections has been illustrated in Fig. 4 of the drawings, in which it will be noted that the contiguous ends of adjacent sections 2 and 3 are each provided with a longitudinal tongue or extension 4, preferably of one-half the thickness of the handle. Each section is furthermore provided with a fixed sleeve or collar 5, located at the base of the tongue and adapted to embrace the free extremity of the opposite tongue when the sections have been assembled. A suitable screw-eye 6 is to be inserted through the sleeve and the base of the tongue of one of the sections and into the free extremity of the opposite tongue, so as to prevent accidental disconnection of the parts, and the screw-eye also has another function, as will be hereinafter described.

Carried at one end of the handle and projecting in advance thereof is a tubular casing 7, which is provided near its opposite ends with pairs of ears 8, embracing the handle and secured thereto by suitable fastenings. The outer end of the casing is contracted, so as to form a comparatively-small discharge-opening 9, and the opposite end of the casing is closed by means of a suitable screw-cap 10. Located within the casing is a plunger 11, to which is connected a plunger-rod 13, extending outwardly through an opening 12, formed in the screw-cap 10. Surrounding the portion of the rod 12 which is contained within the casing 7 is a coiled spring 14, which bears in opposite directions against the plunger 11 and the screw-cap 10. As the casing 7 is located entirely at one side of the handle, it is apparent that the outer portion of the plunger-rod is spaced outwardly from the handle, disposed substantially parallel therewith, and slides loosely through a suitable guide 15, carried by the handle.

To operate the plunger, there is provided a hand-lever 16, pivoted intermediate of its ends to the handle and at a suitable distance from the casing 7. Also this lever is located upon one of the sides of the handle which is adjacent to the casing and is thereby disposed in a plane substantially parallel to that of the handle and the casing. Extending nearly the entire length of the lever and located upon that side which is adjacent to the casing is a substantially-yoke-shaped guide 17, the intermediate portion of which is straight, and one end thereof, adjacent to the handle portion 18 of the lever, is bent outward, so as to form a notch or seat 19. This lever and the plunger-rod are operatively connected by means of a wire 20 or other suitably-flexible connection, one end of which is provided with a loop or eye 21, slidably embracing the guide-rod 17, and the opposite end is engaged with a hook or eye 22, provided at the outer extremity of the plunger-rod. As indicated in Fig. 1, it will be observed that the flexible connection passes through the screw-eye 6, which latter serves to prevent accidental disconnection of the handle-sections, as hereinbefore described, and also to provide a guide for the flexible connection.

In the normal position of the device the loop or eye 21 of the flexible connection is engaged with the seat 19, carried by the operating-lever 16. When it is desired to actuate the plunger, the lever is moved in the direction indicated by the arrow, and as the outer end of the flexible connection is in engagement with the guide-rod 17 such connection will be moved to draw the plunger-rod longitudinally outward, thereby compressing the coiled spring 14. When the lever has reached a position longitudinally of the handle, as indicated in dotted lines in Fig. 1, the flexible connection 20 will become automatically detached from the seat 19 by reason of the tension caused by the compression of the spring 14, whereby the plunger is released and will be quickly forced through the casing to form an air-blast, which will escape through the discharge opening or nozzle 9, as will be understood.

The powder to be discharged is contained within a receptacle 22$^a$, carried by the reduced end of the casing 7 and located opposite the handle. The outer end of this receptacle is provided with a filling-opening 23, which is closed by means of a screw-cap 24. Communication is had between the receptacle 22$^a$ and the reduced end or nozzle of the casing by means of an opening or valve-port 25, formed in the wall between the casing and the receptacle. This valve-port is normally closed by means of the slide-valve 26, located within the receptacle and slidable longitudinally upon the nozzle. This valve is carried at the end of a trip-rod 27, which extends through an opening 28, formed in the inner end of the receptacle, passing loosely through suitable guides 29, provided exteriorly and longitudinally of the casing 7 and opposite the handle. At the outer end of this trip-rod there is provided a head 30, preferably by bending the rod inwardly toward the handle, so as to extend across the inner end of the casing, and thereby located in the path of a trip-shoulder 31, carried by the plunger-rod and normally located within the casing.

In order that the valve-port 25 may be normally closed, so as to prevent loss of the powder contained within the receptacle 22$^a$, there is provided a coiled spring 32, having one end connected to the trip-rod 27 and between adjacent ends of the guides 29 and having its opposite end connected to the outer guide, whereby the normally-compressed condition of the spring locates the slide-valve 26 over the valve-port. A suitable stop-shoulder 33 is carried by the reduced portion of the casing 7 and located within the receptacle 22$^a$ at the outer side of the valve-port, so as to limit the outward movement of the slide-valve.

In the operation of the device paris-green or other suitable poisonous powder is introduced into the receptacle 22$^a$ through the entrance-opening thereof, after which the lever 16 is operated, as hereinbefore described, to actuate the plunger 11, whereby an air-blast is formed. It will be noted that the trip 31 is of substantially-conical form, so that it may readily pass the trip-head 30 in the outward movement of the plunger-rod. During the return movement of the plunger-rod and before the plunger 11 has reached the inward limit of its movement the base of the conical trip 31 engages the inwardly-inclined head 30, thereby moving the trip-rod 27 forward and operating the slide-valve 26 to open the valve-port 25, whereby some of the powder contained within the receptacle 22$^a$ may fall into the nozzle and in the path of the air-blast formed by the inwardly-moving plunger. From this description it will be apparent that the powder is automatically fed to the nozzle and also forced outwardly therethrough by the operation of the plunger-rod. After the plunger has resumed its normal position the valve-port will be again closed by contraction of the coiled spring 32, as will be understood.

As shown in Fig. 2, the opening 13 in the inner end of the casing is of a size to permit of the free passage therethrough of the trip-shoulder 31, so that the latter may assume the position shown in dotted lines in Fig. 1 and exteriorly of the casing when the operating-lever is moved to draw the plunger-rod 12 outwardly. Furthermore, the trip-head 30 is inclined inwardly toward the adjacent end of the casing, so that the base of the conical trip-shoulder may not hang upon said head, and the free end of the trip-rod is free to move laterally outward, so that the trip-shoulder may readily pass the trip-head.

It will be apparent that communication is automatically opened and cut off between the powder-receptacle and the discharge-nozzle by the operation of the plunger-rod, so as to supply a proper amount of powder to the nozzle and in the path of the air-blast passing therethrough and also to prevent loss of the powder during the interval between respective operations of the device. This loss of the powder is prevented by disposing the head 30 adjacent to the forward limit of the movement of the trip-shoulder 31, so that the valve-port is opened after the air-blast has been started, whereby the powder is supplied to the nozzle at the instant required only and the valve-port is normally closed during successive operations of the device. Moreover, the sliding movement of the valve 26 and its connection with the trip-rod provides an agitator operating within the powder-receptacle and preventing the powder from becoming packed or clogged.

It is designed to employ an exceedingly-strong spring 14, so as to produce a correspondingly-strong air-blast for the purpose of destroying nests of the insects or worms in addition to distributing or spraying the powder, and therefore the operating-lever 16 has been provided, so as to facilitate the compression of the spring and to provide for an automatic release thereof.

What I claim is—

1. In an insect-destroyer, the combination with a handle, of a casing having a discharge or spray nozzle, a spring-actuated plunger contained within the casing, a powder-containing receptacle in communication with the nozzle, an operating device for the plunger, a connection between the latter and the operating device, and means for tripping or releasing the latter at a point in the movement of the operating device.

2. In an insect-destroyer, the combination with a handle, of a casing having a discharge or spray nozzle, a spring-actuated plunger contained within the casing, a powder-containing receptacle in communication with the nozzle, a lever mounted upon the handle, an operating connection between the plunger and the lever, and means for tripping or releasing the operating connection at a point in the movement of the lever.

3. In an insect-destroyer, the combination with a handle, of a casing having a discharge or spray nozzle, a spring-actuated plunger contained within the casing, a powder-containing receptacle in communication with the nozzle, a lever mounted upon the handle, a guide carried by the lever and provided with a seat, and an operative connection, having one end secured to the plunger, and its opposite end loosely engaging the seat of the guide, slidable longitudinally upon the latter, and to be released from the seat, at a point in the movement of the lever.

4. In an insect-destroyer, the combination with a handle, of a casing having a discharge or spray nozzle, a spring-actuated plunger working in the casing, a powder-containing receptacle in communication with the nozzle, a lever mounted upon the handle, a yoke-shaped guide-rod provided upon the lever, having a straight intermediate portion, and one end being bent outwardly forming a seat, an operative connection, having one end secured to the plunger, and its opposite end loosely engaging the bend or seat of the guide-rod, slidable longitudinally upon the latter, and to be disengaged from the seat at a point in the operation of the lever.

5. In an insect-destroyer, a spray-nozzle, means for producing an air-blast through the nozzle, a powder-receptacle in communication with said nozzle, a valve normally closing such communication, and a trip device for the valve, said trip device being located in operative relation to the means for producing the air-blast, and adjacent to the forward limit of the movement thereof.

6. In an insect-destroyer, the combination with a handle, of a spray-nozzle carried thereby, means for producing an air-blast through the spray-nozzle, a powder-receptacle provided with a valve-port communicating with the nozzle, a slide-valve for the port and located within the powder-receptacle, a stop to limit the forward movement of the slide-valve, a trip-rod carrying the valve, guides loosely receiving the trip-rod and provided upon the handle, a spring holding the valve normally closed, and a trip-shoulder carried by the means for producing the air-blast, the trip-rod being located on the path of said shoulder, and operated thereby.

7. In an insect-destroyer, a casing, having a spray-nozzle, a powder-receptacle in communication with the nozzle, a plunger working within the casing, a supporting-handle formed in sections, the contiguous ends of the latter having longitudinally-disposed overlapping tongues, sleeves embracing the latter, and a screw-eye passing through one of the sleeves and both of the tongues, operating means mounted upon the handle, and an operative connection between the operating means and the plunger, and also passing loosely through the guide formed by the screw-eye.

8. In an insect-destroyer, the combination with a casing having a spring-actuated plunger, and a discharge-nozzle, of a powder-receptacle, a slide-valve controlling the communication between the nozzle and the powder-receptacle, and working entirely within the latter and forming an agitator for the powder, operating means for the plunger, and means for automatically tripping the valve by the movement of the plunger.

9. In an insect-destroyer, the combination of a casing, having a discharge-nozzle, a spring-actuated plunger working within the casing and forming an air-blast through the nozzle, a plunger-rod, a conical trip-shoulder carried by the plunger-rod, normally located within the casing, and movable to a position exteriorly of the latter, a powder-receptacle in communication with the nozzle, a valve for controlling such communication, a trip-rod carrying the valve, and provided with an inclined trip-head, located exteriorly of the casing and in the path of the trip-shoulder, and having a lateral movement away from the latter, and means for operating the plunger-rod.

10. In an insect-destroyer, the combination with a handle, of a spray-nozzle carried thereby, a plunger operating to form an air-blast through the nozzle, an operating-plunger rod, a powder-receptacle in communication with the nozzle, a valve normally closing said communication, a trip-rod connected to the valve, a trip-shoulder carried by the plunger-rod, the trip-rod being located in operative relation to the trip-shoulder and adjacent to the forward limit of the movement thereof.

In testimony that I claim the foregoing as my own I have hereto affixed my signature in the presence of two witnesses.

WILLIAM JAY BARBER.

Witnesses:
W. R. HUNT,
C. B. PIERCE.